US 8,078,020 B2

(12) United States Patent
Rasras

(10) Patent No.: US 8,078,020 B2
(45) Date of Patent: Dec. 13, 2011

(54) OPTICAL MODE-CONVERTER STRUCTURE

(75) Inventor: Mahmoud Rasras, Berkeley Heights, NJ (US)

(73) Assignee: Alcatel Lucent, Paris (FR)

( * ) Notice: Subject to any disclaimer, the term of this patent is extended or adjusted under 35 U.S.C. 154(b) by 288 days.

(21) Appl. No.: 12/099,200

(22) Filed: Apr. 8, 2008

(65) Prior Publication Data
US 2009/0252456 A1    Oct. 8, 2009

(51) Int. Cl.
G02B 6/26 (2006.01)
G02B 6/42 (2006.01)
G02B 6/02 (2006.01)
G02B 6/10 (2006.01)

(52) U.S. Cl. .............. 385/28; 385/43; 385/129
(58) Field of Classification Search ........... 385/28, 385/29, 43, 129–132
See application file for complete search history.

(56) References Cited

U.S. PATENT DOCUMENTS

| | | | | |
|---|---|---|---|---|
| 4,076,378 | A * | 2/1978 | Cole | 385/115 |
| 5,278,926 | A * | 1/1994 | Doussiere | 385/28 |
| 5,583,676 | A | 12/1996 | Akiyama et al. | |
| 6,408,125 | B1 | 6/2002 | Akwani et al. | |
| 6,801,692 | B2 * | 10/2004 | Nishimura et al. | 385/49 |
| 6,856,745 | B2 | 2/2005 | Erben et al. | |
| 6,931,180 | B2 | 8/2005 | Madsen et al. | |
| 7,076,135 | B2 * | 7/2006 | Yamada et al. | 385/43 |
| 7,155,096 | B2 * | 12/2006 | Chanclou et al. | 385/123 |
| 7,218,809 | B2 * | 5/2007 | Zhou et al. | 385/28 |
| 7,616,854 | B2 * | 11/2009 | Gill et al. | 385/43 |
| 2002/0031306 | A1 * | 3/2002 | Ambrosy et al. | 385/49 |
| 2004/0017975 | A1 * | 1/2004 | Zheng et al. | 385/43 |
| 2004/0264863 | A1 * | 12/2004 | Suzuki et al. | 385/43 |
| 2005/0265653 | A1 * | 12/2005 | Cai et al. | 385/28 |
| 2006/0029348 | A1 * | 2/2006 | Kempen et al. | 385/129 |
| 2006/0285797 | A1 * | 12/2006 | Little | 385/43 |

OTHER PUBLICATIONS

Espinola, Richard L., et al.; "Raman amplification in ultrasmall silicon-on-insulator wire waveguides"; Optics Express, vol. 12, No. 16; Aug. 9, 2004, pp. 3713-3718.
Roelkens, G.; et al.; "Efficient Silicon-On-Insulator fiber coupler fabricated using 248nm deep UV lithography"; Photonics Technology Letters, IEEE, vol. 17, Issue 12; Dec. 2005; pp. 2613-2615.
Shoji, T.; et al.; "Low loss mode size converter from 0.3um square Si wire waveguides to singlemode fibres"; Electronics Letters, vol. 38, No. 25; Dec. 5, 2002; pp. 1669-1670.
McNab, Sharee J.,. "Ultra-low loss photonic integrated circuit with membrane-type photonic crystal waveguides"; Optics Express, vol. 11, No. 22; Nov. 3, 2003; pp. 2927-2939.

* cited by examiner

Primary Examiner — Rhonda Peace
(74) Attorney, Agent, or Firm — Hitt Gaines, PC

(57) ABSTRACT

An apparatus comprising an optical-mode-converter structure. The optical-mode-converter structure includes a tapered optical core on a planar substrate, an optical cladding layer covering the tapered optical core and a mode-expanding layer. The mode-expanding layer covers the tapered optical core and is located in-between the tapered optical core and the optical cladding layer. The mode-expanding layer has a refractive index that is in-between a refractive index of the tapered optical core and a refractive index of the optical cladding layer.

22 Claims, 5 Drawing Sheets

OPTICAL MODE-CONVERTER STRUCTURE

U.S. GOVERNMENT

The U.S. Government has a paid-up license in this invention and the right in limited circumstances to require the patent owner to license others on reasonable terms as provided for by the terms of Contract No. HR011-05-C-0027 awarded by DARPA.

TECHNICAL FIELD OF THE INVENTION

The present invention is directed, in general, to an optical apparatus and, more specifically, to an optical-mode-converting structure and methods for operating and manufacturing the same.

BACKGROUND OF THE INVENTION

Waveguides and optical fibers are important components of optical communication systems. Waveguides, such as optical planar waveguides, are used in various optical components such as switches, couplers, splitters, filters, multiplexers and de-multiplexers, channelizers and chromatic polarization dispersion compensators. Optical fibers are used to transmit optical signal over a distance to and from these optical components. The strength of the optical signal transmitted through the optical communication system typically depends, at least in part, on how efficiently optical signals are transferred between optical waveguides and optical fibers.

SUMMARY

One embodiment includes an apparatus that comprises an optical-mode-converter structure. The optical-mode-converter structure includes a tapered optical core on a planar substrate, an optical cladding layer covering the tapered optical core and a mode-expanding layer. The mode-expanding layer covers the tapered optical core and is located in-between the tapered optical core and the optical cladding layer. The mode-expanding layer has a refractive index that is in-between a refractive index of the tapered optical core and a refractive index of the optical cladding layer.

In some embodiments, the mode-expanding layer has a thickness of less than 1300 nanometers, less than 650 nanometer, or less than 130 nanometers. Some such embodiments are configured to couple a planar waveguide to a single-mode optical fiber configured to transmit light at a wavelength ranging from about 1300 nanometers to about 1700 nanometers.

Another embodiment is a method for operating an apparatus. The method of operating comprises sending an optical signal through a core of an optical fiber having a first mode size. The method also comprises coupling the optical signal between the optical fiber core and a planar waveguide core having a second mode size, including expanding the second mode size to substantially match the first mode size by passing the optical signal through the above-described optical-mode-converter structure.

Another embodiment is a method of manufacturing an apparatus, which comprises fabricating the optical-mode-converter structure. The method of fabricating includes providing a planar substrate having a first material layer on a second material layer, wherein the first material layer has a higher refractive index than the second material layer. Fabricating the optical-mode-converter structure also includes patterning the first material layer to form a tapered optical core and coating the tapered optical core with a third material to form a mode-expanding layer of a first thickness. The mode-expanding layer has a refractive index that is lower than a refractive index of the tapered optical core. Fabricating the optical-mode-converter structure further includes covering the tapered optical core and the mode-expanding layer with a fourth material to form an optical cladding layer. The refractive index of the mode-expanding layer is greater than a refractive index of the optical cladding layer.

BRIEF DESCRIPTION OF THE DRAWINGS

The various embodiments can be understood from the following detailed description, when read with the accompanying figures. Various features may not be drawn to scale and may be arbitrarily increased or reduced in size for clarity of discussion. Reference is now made to the following descriptions taken in conjunction with the accompanying drawings, in which.

DETAILED DESCRIPTION

Herein it is recognized that efficient transfer between a waveguide and an optical fiber can be inefficient because the optical mode size in the optical fiber is much larger than the optical mode in the waveguide. Because of this size incompatibility, there can be substantial coupling losses when interfacing the large mode of the optical fiber to the compact mode of the waveguide.

The use of lensed fibers to focus light from the fiber's mode to better match the mode size of the waveguide is problematic because of poor alignment tolerance and difficulties in obtaining high quality lensed fibers. The use of low-index polymer waveguides to capture light from the fiber and transfer the light into a smaller waveguide has limited application because the polymer can degrade over time, and because chemicals from the polymer can contaminate other processes to fabricate electrical device components (e.g., transistors) that are integrated on the same substrate as the waveguide.

Tapering the end of waveguide core, or, coupling the waveguide core to a tapered structure, such that the narrow end of the tapered core is smaller than the core of the waveguide fiber, increases the mode size of the waveguide core. However, in some cases, to achieve mode size matching, this narrow end is so narrow as to make the tapered structure's manufacture expensive and difficult to consistently produce with the same dimensions.

Herein various embodiments can circumvents these problems by relaxing the extent of tapering needed to achieve mode-size matching. By providing a mode-expanding layer in-between a tapered optical core and an optical cladding layer, the extent of tapering needed is reduced, thereby making it less expensive and easier to produce the tapered feature with suitable dimensions.

The waveguide core in planar waveguides can have a much large refractive index than the waveguide cladding around the core. Because of the large refractive index difference, a very narrow tapered core is often required to achieve mode-size matching. By selecting a mode-expanding layer with the appropriate physical and optical properties, the optical mode can be expanded to a greater degree for a more modest amount of core narrowing. Consequently, the mode-expanding layer, as well as its optical properties and physical dimensions, are newly-discovered result-effective variables that provide a new means to facilitate mode-size matching between optical waveguides and optical fibers.

Figure 1A:
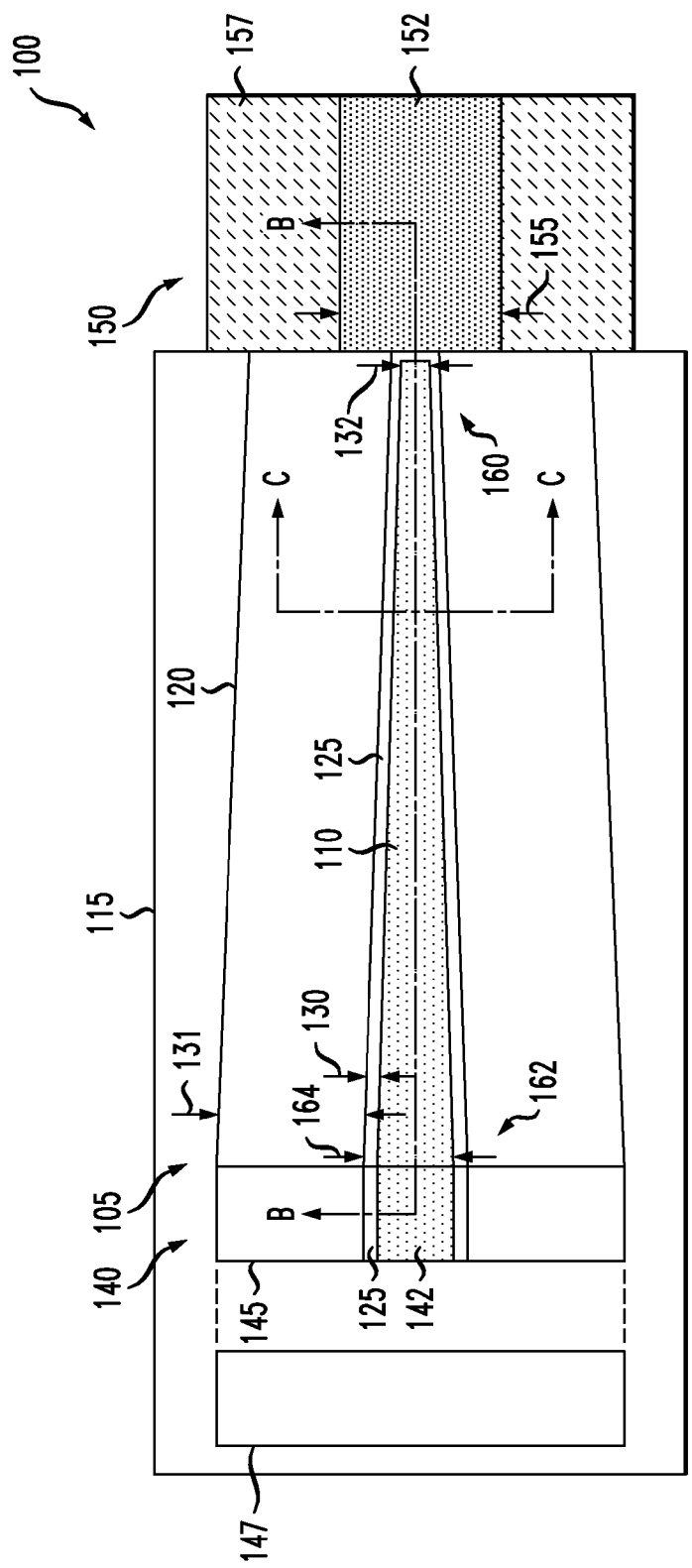
FIG. 1A presents a plan view of an example apparatus of the present disclosure.
Figure 1B:
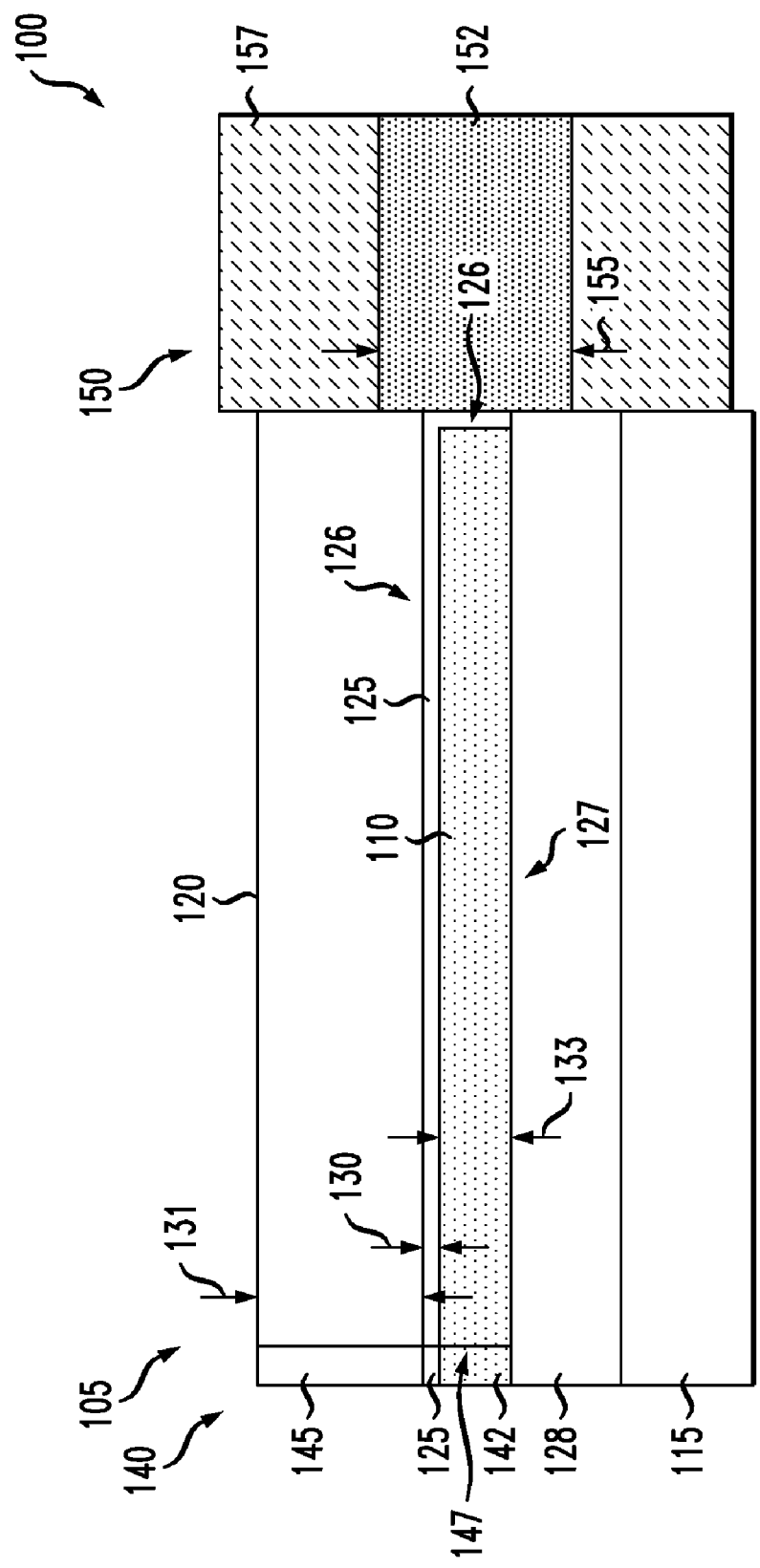
FIG. 1B presents a cross-sectional views of the example apparatus shown in FIG. 1A along view line B-B.
Figure 1C:
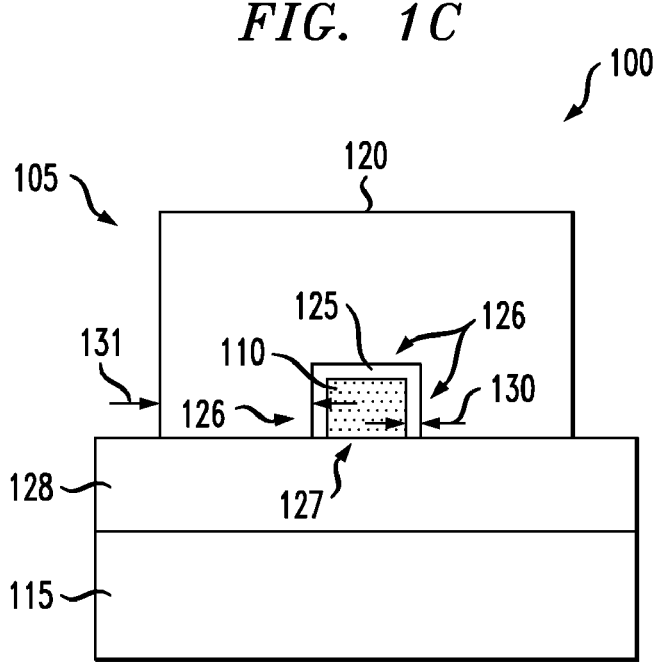
FIG. 1C presents a cross-sectional views of the example apparatus shown in FIG. 1A along view line C-C.

FIG. 1A presents a plan view of an example apparatus 100 of the present disclosure that incorporates the above-described features. FIGS. 1B and 1C present cross-sectional views of the same apparatus along view lines B-B and C-C, respectively.

The apparatus 100 comprises an optical-mode-converter structure 105 that includes a tapered optical core 110 on a planar substrate 115 and an optical cladding layer 120 covering the tapered optical core 110. A mode-expanding layer 125 covers the tapered optical core 110 and is located in-between the tapered optical core 110 and the optical cladding layer 120. To facilitate the viewing of underlying structures, the optical cladding layer 120 and mode-expanding layer 125 are shown in transparent outline. The mode-expanding layer 125 has a refractive index ($RI_{mel}$) that is in-between a refractive index ($RI_{toc}$) of the tapered optical core 110 and a refractive index ($RI_{ocl}$) of the optical cladding layer 120.

As shown in FIGS. 1B and 1C, the mode-expanding layer 120 can cover the planar tapered optical core 110 on all sides 126 except a side 127 adjacent to the substrate 115. In some embodiments, the substrate 115 includes a material layer 128 having a refractive index that has about the same (e.g., within about 1 percent) refractive index as the optical cladding layer 120. For example, both the optical cladding layer 120 and the material layer 128 can be composed of the same material.

An optical-mode-converter structure 105 with the mode-expanding layer 125 is particularly advantageous in situations where extensive tapering to achieve mode-size matching would otherwise have to be performed. Such situations may arise when the tapered optical core 110 and the optical cladding layer 120 have a large percent difference in refractive indexes. The optical-mode-converter structure 105 is often desirable when the percent difference in refractive index of the tapered optical core 110 and optical cladding 120 (e.g., $100\% \times (RI_{toc} - R_{ocl})/R_{toc}$) equals at least about 20 percent, and in some cases equals, about 50 to 60 percent. For instance, when the tapered optical core 110 is substantial composed of silicon (e.g., $RI_{toc}$ equals about 3.4) and the optical cladding 120 is substantially composed of silicon oxide (e.g., $RI_{ocl}$ equals about 1.45), then the percent difference in refractive index equals about 57 percent.

To expand the optical mode of the tapered optical core 110 to match the optical mode of an optical fiber, it is often useful that the mode-expanding-layer 125 have refractive index that differs from both the tapered optical core 110 and cladding layer 120 by at least some minimal value. If the difference in refractive index compared to the core 110 is too small, then the optical mode will often not be sufficiently expanded into the mode-expanding layer 125 and into the optical cladding 120. If the difference refractive index is too small compared to the cladding 120, then the optical mode is often not sufficiently expanded because then the mode-expanding layer 125 has substantially the same optical confining properties as the cladding layer 120.

In light of these considerations, in some preferred embodiments, the mode-expanding-layer 125 has a refractive index that is at least about 10 percent less than the refractive index of the tapered optical core 110, and at least about 10 percent greater than the refractive index of the cladding layer 120. Consider again the example where the tapered optical core 110 is substantial composed of silicon and the optical cladding 120 is substantially composed of silicon oxide. The mode-expanding layer 125 may have, e.g., refractive index of between about 2.8 or less and a refractive index of about 1.6 or greater. Such is the case when the mode-expanding layer 125 is substantially composed of silicon nitride (e.g., $RI_{mel}$ equals about 2.1).

In some embodiments, the mode-expanding layer 125 has a thickness 130 that is less than a thickness 131 of the optical cladding layer 120 (FIGS. 1B and 1C). In some cases, the optical cladding layer 120 thickness 131 ranges from about 1 to 20 microns. In some embodiments, to maximize the amount of light transferred to the structure 105, e.g., from a waveguide fiber having a mode size of 8 to 10 microns, the optical cladding layer 120 thickness 131 is greater than about 3 microns and more preferably greater than about 5 microns.

To expand the optical mode of the tapered optical core 110 to match the optical mode of an optical fiber, it is may be desirable that the mode-expanding-layer 125 have a certain thickness 130, or relative thickness as compared to the narrow-end lateral width 132 or vertical height 133 of the tapered optical core 110. It can be difficult to consistently manufacture such a layer 125 with a uniform thickness 130 if its thickness 130 is too small. A non-uniform thickness is undesirable because then the extent to which the optical mode is expanded is not well-controlled. Non-uniform expansion of the optical mode into the optical cladding 120, in turn, can cause light scattering losses. If the thickness 130 is too large, however, then the optical mode can become confined to the mode-expanding-layer 125 and not expanded into the optical cladding layer 120. This, in turn, can result in poor size-matching with the optical mode of an optical fiber.

In some preferred embodiments, to minimize signal transmission losses, the mode-expanding layer 125 has a thickness 130 that is less than the thickness of the tapered optical core 110. For instance, the mode-expanding layer's 125 thickness 130 can range from about 5 to 25 percent of a narrow-end lateral width 132 (FIG. 1A) and/or a vertical height 133 (FIG. 1B) of the tapered optical core 110. In some cases, a tapered optical core 110 having a narrow end width 132 and height 133, both ranging from about 100 to 400 microns, the thickness 130 of the mode-expanding layer 125 ranges from about 5 to 100 nanometers. In some preferred embodiments, the thickness 130 of mode-expanding layer 125 ranges from about 5 to 50 nanometers, and more preferably about 10 to 20 nanometers.

In other preferred embodiments, to minimize signal transmission losses, it is desirable for the thickness 130 of the mode-expanding layer 125 to be less than the wavelength used for optical signal transmission in telecommunication applications (e.g., about 1300 to 1700 nm). In some cases, for instance, the thickness 130 is preferably less than about 50 percent, or more preferably less than about 10 percent, of optical signal transmission wavelength. For instance, when the signal transmission wavelength equals about 1300 nm, the thickness 130 can be less than 1300 nm, preferably less than about 650 nm, and more preferably less than about 130 nm.

As indicated above, having a mode-expanding-layer 125 of uniform thickness is often important to achieving adequate mode-size matching while also avoiding light-scattering losses. In some embodiments, the thickness 130 of the mode-expanding-layer 125 has a thickness variation of about ±10 percent or less.

It is sometimes preferable for the tapered optical core 110 to be composed of ultra-high refractive index materials because such materials are conducive to the manufacture of a compact apparatus 100. Herein, ultra-high refractive index materials are defined as those materials having a refractive index ranging from about 3 to 4. Advantageously, certain such materials (e.g., silicon), can also be used in the manufacture of integrated circuits configured as electrical devices, photonic devices or both (e.g., optoelectronic devices).

Some preferred materials for the mode-expanding layer 125 have a refractive index ranging from about 1.8 to 2.1. Such materials are preferred when used with a tapered optical core 110 composed of ultra-high refractive index material, and an optical cladding layer 120 having a refractive index of about 1.4 to 1.5 (e.g., a silicon oxide optical cladding layer). Non-limiting example materials for the mode-expanding layer 125 include silicon nitride, silicon oxynitride, silicon germanium nitride or silicon hydrogen nitride.

Figure 2:
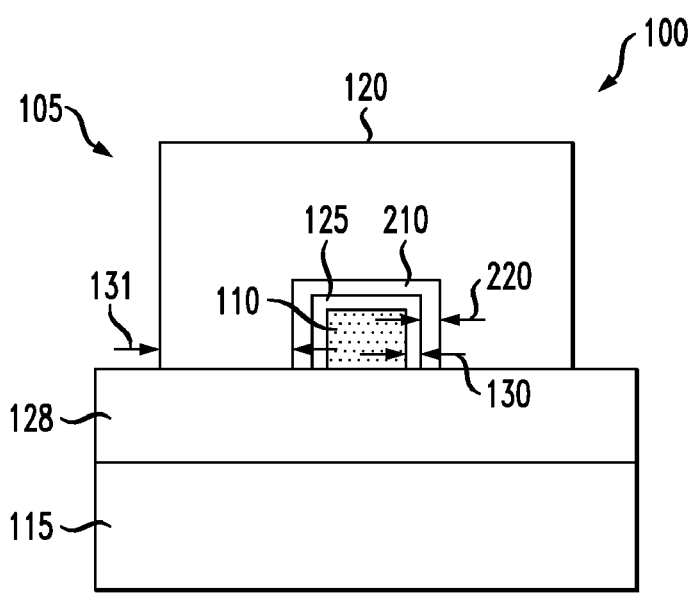
FIG. 2 presents a cross-sectional views of an alternative embodiment of the example apparatus shown in FIG. 1A along view line C-C.

To further facilitate mode-size matching, in other embodiments of the structure 105, there can be a plurality of mode-expanding layers (not shown). For instance, as illustrated in FIG. 2, a cross-sectional view analogous to FIG. 1C, there can be a second mode-expanding layer 210 located in-between the mode-expanding layer 125 and optical cladding layer 120. The second mode-expanding layer 210 can have a refractive index that is in-between the refractive index of the mode-expanding layer 125 and the refractive index of the optical cladding layer 120. The thickness 220 of the second mode-expanding layer 210 may be selected based on the above-described considerations for the thickness 130 of the first mode-expanding layer 125. For instance, the thickness 220 of the second mode-expanding layer 210 is also less than the thickness of the tapered optical core 110, or, is less than the wavelengths of light used for telecommunications via silica-glass optical fibers, e.g. less than about 1300 nm.

In some cases, such as illustrated in FIGS. 1A-1B, the optical-mode-converter structure 105 is continuous with a waveguide 140 of the apparatus 100. In some preferred embodiments, the optical planar waveguide 140 is located on the same substrate 115 and is directly coupled to said optical-mode-converter structure 105. In some embodiments, an integrated circuit 147 is also on the substrate 115, and the integrated circuit 147 is coupled to the waveguide 140 (FIG. 1A). Such configurations are desirable when the apparatus 100 is configured as, or includes, an optoelectronic device or other optical component in an optical fiber communication system.

The waveguide 140 can include a planar waveguide core 142 and a waveguide cladding 145 covering the core 142. In some embodiments, is it preferable for the tapered optical core 110 to be continuous with a waveguide core 142 and the optical cladding layer 120 to be continuous with a waveguide cladding 145. In such embodiments, the mode-expanding layer 125 does not cover the side 147 of the tapered optical core 110 that is adjacent to the waveguide core 142. Having the tapered optical core 110 be continuous with a waveguide core 142 permits a simplified manufacturing process, and, may help minimize light losses between the converter structure 105 and the waveguide 140. For instance, the tapered optical core 110 and waveguide core 142 can be composed of the same material, and patterned in the same process steps. The optical cladding layer 120 and waveguide cladding 145 covering the core 142 can also be composed of the same material and deposited in the same chemical vapor deposition (CVD) step.

In some cases, it is also advantageous for the mode-expanding-layer 125 to cover both the tapered optical core 110 and waveguide core 142. This configuration can be advantageous because it avoids any abrupt changes in the refractive index of the material covering tapered optical core 110 and waveguide core 142 at the interface 150 between the tapered optical core 110 and waveguide core 142. Abrupt changes in the refractive index of the material covering at the interface 150 of the tapered core 110 and waveguide core 142 can cause light scattering losses.

In other cases, however, the optical-mode-converter structure 105 is a separate structure from the waveguide 140. In such cases, the optical-mode-converter structure 105 can be constructed in a separate process from the waveguide's 140 fabrication, and then, the waveguide 140 and converter structure 105 can be coupled together so as to allow optical signals transmission through these structures. In such cases, the mode-expanding layer 125 may cover the tapered optical core 110, but not the waveguide core 142. Even when the tapered waveguide core 110 is continuous with the waveguide core 142, there can be embodiments where the mode-expanding layer 125 only covers the tapered optical core 110.

FIGS. 1A and 1B further illustrate the case when apparatus 100 also includes an optical fiber 150. For instance, the optical fiber 150 can be configured to transfer an optical signal sent to or from the optical-mode-converter structure and on to the waveguide 140 and to the integrated circuit 147 for processing of the optical signal. This can be the desirable when the apparatus, configured as an optoelectronic device, operates as an optical channelizer.

The optical fiber 150 can be a standard single mode fiber. A standard single mode fiber may be easier to align than a multimode fiber. However, other fiber type can be used, if desired. Consider the case where the optical fiber 150 has an optical mode size of about 8 to 10 microns. The term optical mode size, as used herein, refers to the size at the waist of the optical mode where light intensity goes to approximately 1/e, or about 67 percent, of its central peak value. In such embodiments, the cylindrical core 152 may have a diameter 155 ranging from about 7 to 8 microns. The core 152 can be surrounded by a cladding 157 having a slightly lower refractive index (e.g., 0.4 to 0.5 percent lower) than that of the core 152.

The dimensions of the tapered optical core 110 and the mode-expanding layer 125 can be adjusted as needed to facilitate optical mode-size matching between the optical fiber 150 and the waveguide 140. To facilitate mode size matching, the core 152 of the optical fiber 150 can be directly coupled to a narrow-end 160 of the tapered optical core 110, and, the waveguide core 152 can be directly coupled to the wide-end 162 of the tapered optical core 110. In some embodiments the tapered optical core 110 is tapered from a wide-end width 164 of about 400 to 3000 nanometers to a narrow-end width 132 of about 100 to 300 nanometers. To facilitate maximum signal transfer, the dimension of the wide-end 162 may substantially match the dimensions of the waveguide (e.g., width and height matching within about 10 percent). The embodiment shown in FIGS. 1A-1C is laterally tapered and has a constant vertical height 133 (e.g., about 200 nanometers). In other embodiments, however, the tapered optical core 110 can be vertically tapered, or, both laterally and vertical tapered. Example processes for constructing vertically tapered cores are presented in U.S. Pat. No. 6,931,180 to Madsen et al., hereby incorporated by reference in its entirety.

In some embodiments, the mode-expanding layer 125 has a thickness 130 of less than 1300 nanometers, less than 650 nanometer, or less than 130 nanometers. Some such embodiments are configured to couple the planar waveguide 140 to the single-mode optical fiber 150 configured to transmit light at a wavelength ranging from about 1300 nanometers to about 1700 nanometers.

Consider the case when the tapered optical core 110, optical cladding layer 120 and mode-expanding layer 125 comprise silicon, silicon oxide and silicon nitride, respectively. A mode-expanding layer 125 thickness 130 of about 15 nanometers can facilitate expansion of the mode size of the tapered optical core 110 such that a narrow-end width 132 of about 200 nanometers is used to match the about 8 to 10 micron mode size of the optical fiber 150. This compares favorably to a narrow-end width 132 of about 100 to 130 nanometers which might otherwise be used to achieve similar mode-size matching, in the absence of the mode-expanding layer 125.

Figure 3:
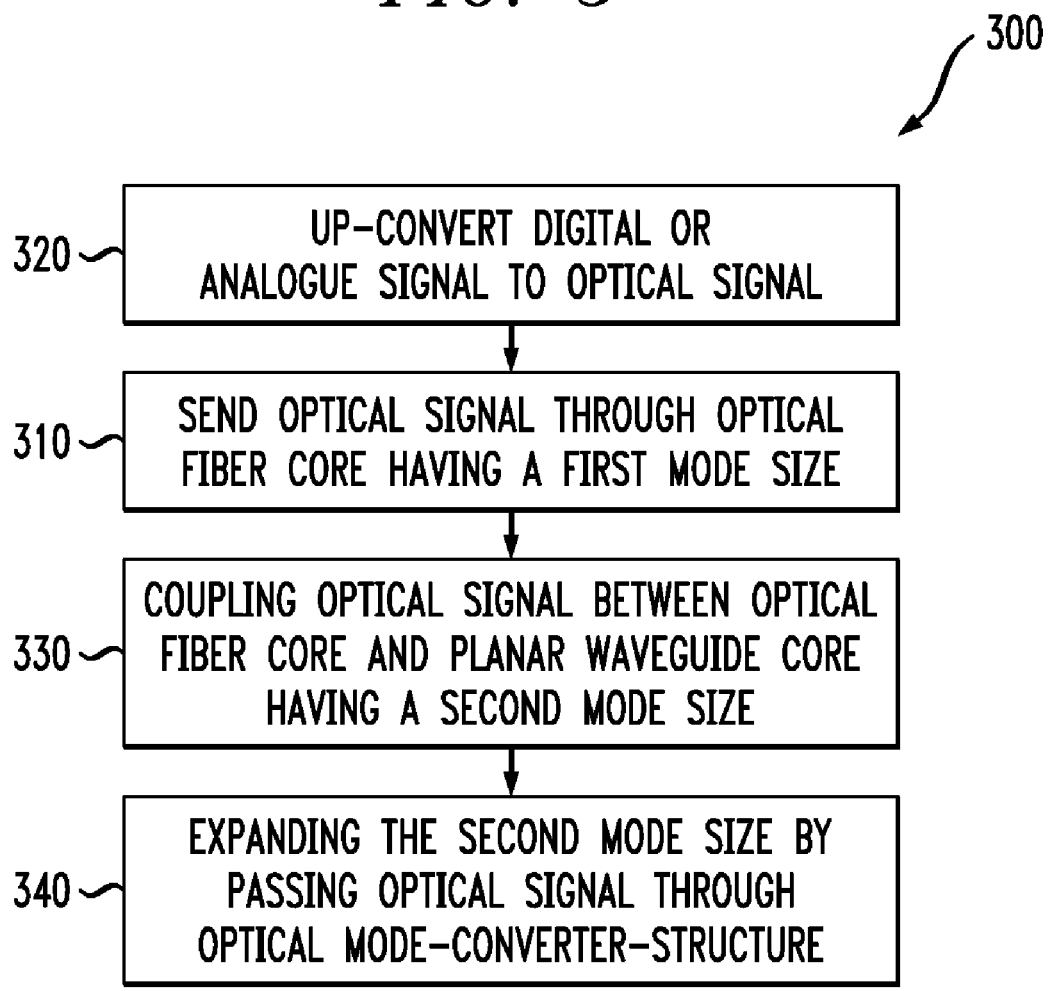
FIG. 3 presents a flow diagram illustrating an example method for operating an apparatus of the disclosure, e.g., the apparatus of FIGS. 1A-1C, 2.

Another embodiment is a method of operating an apparatus. FIG. 3 presents a flow diagram illustrating an example method 300 for operating an apparatus of the disclosure. Any of the embodiments of the apparatus 100 and its optical-mode-converter structure 105 discussed in the context of FIGS. 1A-2 can be operated in the method 300. The method includes a step 310 of sending an optical signal through a core of an optical fiber having a first mode size. In some embodiments, the optical signal includes an analogue or a digital signal that is up-converted (step 320) to optical wavelengths (e.g., about 1300 to 1700 nm) such as commonly used in optical communication systems. However, the optical signal could include other wavelengths of light, and, can have information encoded in other fashions well-known to those skilled in the art. In some embodiments, the first mode size of the optical fiber ranges from about 8 to 10 microns, or in some cases, is between about 8 microns and about 10 microns.

The method also includes a step 330 of coupling the optical signal between (e.g., to or from) the optical fiber core and a planar waveguide core having a different second mode size using an optical-mode-converter structure. In some embodiments, the second mode size of the waveguide ranges from about 0.5 microns to about 1 micron, or in some cases, is between about 0.5 microns and about 1 micron.

Coupling (step 330) can include a step 340 of expanding the second mode size to match the first mode size (for example, within about 10 percent) by passing the optical signal through an optical-mode-converter structure. Any of the embodiments of the optical-mode-converter structure 105 discussed in the context of FIGS. 1A-2 can be used to achieve mode-size matching. For instance, the optical-mode-converter structure used in steps 330 and 340 can include a tapered optical core on a planar substrate, an optical cladding layer covering said optical core and a mode-expanding layer covering said tapered optical core and in-between said tapered optical core and said optical cladding layer. The mode-expanding layer has a refractive index that is in-between a refractive index of the tapered optical core and a refractive index of the optical cladding layer.

In some cases, the second mode size at one end (e.g., the narrow end 160, FIG. 1A) of the tapered core of the optical-mode-converter structure that is adjacent to the optical fiber can have a mode size that is substantially expanded to be the same as the first mode size. In some preferred embodiments, the coupling loss of the optical signal passing between the optical fiber core and the planar waveguide core is about 0.2 dB or less.

Figure 4:
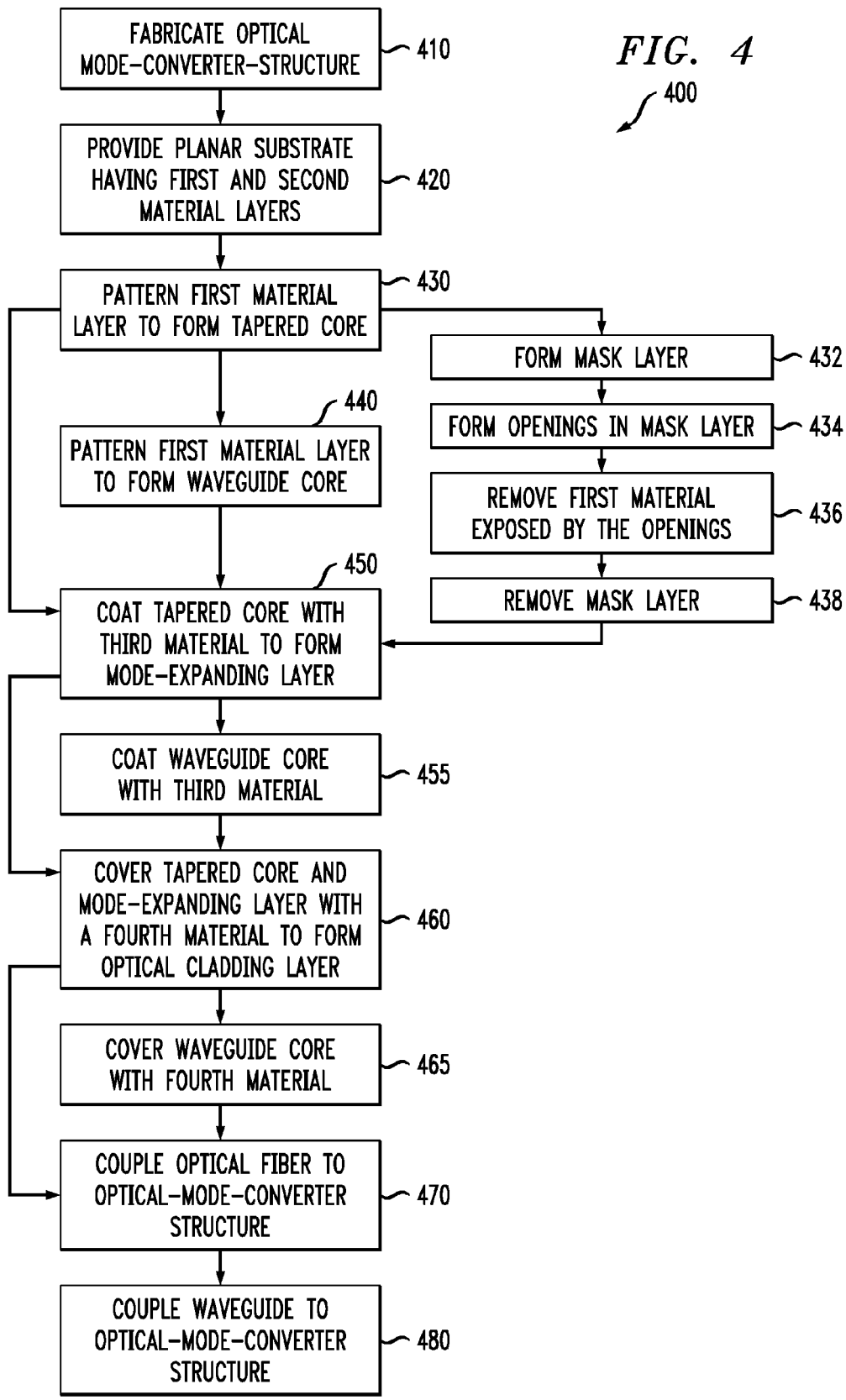
FIG. 4 presents a flow diagram illustrating an example method for manufacturing an apparatus of the disclosure e.g., the apparatus of FIGS. 1A-1C, 2.

Another embodiment is a method for manufacturing an apparatus. FIG. 4 presents a flow diagram illustrating an example method 400 for manufacturing an apparatus of the disclosure. Any of the embodiments of the apparatus 100 and its component parts discussed in the context of FIGS. 1A-2 can be manufactured by the method 400.

The method 400 includes fabricating an optical-mode-converter structure (step 410). Fabricating the optical-mode-converter structure can include a step 420 of providing a planar substrate. The planar substrate has a first material layer on a second material layer, wherein the first material layer has a higher refractive index than the second material layer. A silicon-on-insulator substrate is an example planar substrate, where for example, the second material layer is silicon oxide, and the first material layer is silicon epitaxially grown on the silicon oxide layer. In other cases however, the silicon oxide second material can be formed by low-pressure steam oxidation of a silicon substrate followed by a thermal anneal. Then, the higher refractive index silicon first material layer is deposited on the silicon oxide layer by Plasma Enhanced Chemical Vapor Deposition (PECVD) or Low Pressure Chemical Vapor Deposition (LPCVD).

Fabricating the optical-mode-converter structure (step 410) can also include a step 430 of patterning the first material layer to form a tapered optical core. In some cases, patterning in step 430 includes forming a mask layer (step 432). Forming the mask can include, for example, depositing conventional photoresist, hardmask layers or both. Patterning can further include forming openings (step 434) in the mask layer, using conventional lithographic procedures. This can be followed by removing portions of the first material layer exposed by the openings (step 436). For instance, a reactive ion etch or other conventional etch process can be used to remove portions of a silicon material layer through the openings. The second material layer (e.g., silicon oxide) can serve as an etch stop layer in some instances. The mask layer can then be removed in step 438, leaving the tapered optical core, which comprises the first material layer that was not removed.

In some preferred embodiments, the patterning step 430 further includes patterning the first material layer to form a waveguide optical core (step 440). That is, the first material layer patterned in step 430 can include forming both the tapered optical core and the waveguide optical core. In such embodiments, the waveguide optical core can be on the planar substrate and continuous with the tapered optical core.

Fabricating the optical-mode-converter structure (step 410) can also include a step 450 of coating the tapered optical core with a third material to form a mode-expanding layer of a first thickness. The mode-expanding layer has a refractive index that is lower than a refractive index of the tapered optical core. In some embodiments, the first thickness of the mode-expanding layer is less than a thickness (e.g., width and/or height of the tapered optical core) In some embodiments, the coating step 450 includes chemical vapor deposition of a silicon nitride third material to form the mode-expanding layer. In some preferred embodiments, the coating step further includes coating the waveguide optical core with the third material (step 455). For instance, the waveguide optical core formed in step 440 can be conformally coated with the third material as part of the coating step 450.

Fabricating the optical-mode-converter structure (step 410) can also include a step 460 of covering the tapered optical core with a fourth material to form an optical cladding layer. The refractive index of the mode-expanding layer formed in step 450 is greater than a refractive index of the optical cladding layer. In some embodiments, the first thickness of the mode-expanding layer is less than a thickness of the optical cladding layer. In some embodiments, the covering step 460 includes chemical vapor deposition of a silicon oxide fourth material to form the optical cladding layer. In some preferred embodiments, the covering step further includes covering the waveguide optical core with the fourth material (step 465). For instance, the waveguide optical core formed in step 440 can be covered with the fourth material as part of the covering step 460. In some preferred embodiments the fourth material and second material have substantially the same refractive index (e.g., within about 1 percent), and in some cases, have substantially the same composition. For instance, the second and fourth material can both be silicon oxide.

The method 400 can include numerous additional steps to complete the manufacture of the apparatus. For instance, the method 400 can further include a step 470 of coupling an optical fiber to the optical-mode-converter structure. For instance, optical adhesives, such as epoxies, can be using to facilitate coupling of the optical fiber to the narrow end of the tapered optical core.

In cases where the waveguide is not constructed as part of the steps to manufacture the optical-mode-converter structure, the method 400 can include a separate step 480 of coupling the waveguide to the other end of the tapered optical core. For instance, optical adhesives can be used to facilitate coupling of the waveguide to a wide end of the tapered optical core.

Although the present invention has been described in detail, those skilled in the art should understand that they can make various changes, substitutions and alterations herein without departing from the scope of the invention.

What is claimed is:

1. An apparatus, comprising:
    an optical-mode-converter structure, including:
        a tapered optical core on a planar substrate;
        an optical cladding layer covering said tapered optical core;
        a mode-expanding layer directly contacting said tapered optical core, wherein:
            said optical cladding layer directly contacts said mode-expanding layer that directly contacts said tapered optical core,
            said mode-expanding layer has a refractive index that is in-between a refractive index of said tapered optical core and a refractive index of said optical cladding layer, and
            said mode-expanding layer directly contacting said tapered optical core has a uniform thickness; and
        a second mode-expanding layer is located in-between said mode-expanding layer and said optical cladding layer, said second mode-expanding layer having a refractive index that is in-between said refractive index of said mode-expanding layer and said refractive index of said optical cladding layer.

2. The apparatus of claim 1, wherein said mode-expanding layer covers said tapered optical core on all sides except a side adjacent to said substrate.

3. The apparatus of claim 1, wherein said tapered optical core and said optical cladding layer have a percent difference in refractive index of at least about 20 percent.

4. The apparatus of claim 1, wherein said tapered optical core is substantially composed of silicon, said mode-expanding layer is substantially composed of silicon nitride, and said optical cladding layer is substantially composed of silicon oxide.

5. The apparatus of claim 1, wherein said refractive index of said mode-expanding layer is at least about 10 percent lower than said refractive index of said tapered optical core, and, said refractive index of said mode-expanding layer is at least about 10 percent greater than said refractive index of said optical cladding layer.

6. The apparatus of claim 1, wherein said thickness of said mode-expanding layer is less than about 1300 nanometers.

7. The apparatus of claim 1, wherein said thickness of said mode-expanding layer is less than about 650 nanometers.

8. The apparatus of claim 1, wherein said thickness of said mode-expanding layer is in a range from about 5 to 50 nanometers.

9. The apparatus of claim 1, wherein said thickness of said mode-expanding layer has a thickness variation of about +10 percent or less.

10. The apparatus of claim 1, wherein said refractive index of tapered optical core ranges from about 3 to 4, and said refractive index of said mode-expanding layer ranges from about 1.8 to 2.1, and said refractive index of said optical cladding layer ranges from about 1.4 to 1.5.

11. The apparatus of claim 1, further including:
    an optical planar waveguide on said planar substrate wherein a core of said waveguide is directly coupled to a wide end of said tapered optical core; and
    an optical fiber wherein a core of said optical fiber is directly coupled to a narrow end of said tapered optical core.

12. The apparatus of claim 11, wherein said optical fiber is a standard single mode fiber having an optical mode size of about 8 to 10 microns.

13. The apparatus of claim 1, further including an optical planar waveguide on said substrate and directly coupled to said optical-mode-converter structure and an integrated circuit on said substrate, said integrated circuit coupled to said optical planar waveguide.

14. The apparatus of claim 1, wherein said optical-mode-converter structure is part of the apparatus configured as an optoelectronic device in an optical fiber communication system.

15. An apparatus, comprising:
    an optical-mode-converter structure, including:
        a tapered optical core on a planar substrate;
        an optical cladding layer covering said tapered optical core;
        a mode-expanding layer covering said tapered optical core and located in-between said tapered optical core and said optical cladding layer, wherein:
            said mode-expanding layer has a refractive index that is in-between a refractive index of said tapered optical core and a refractive index of said optical cladding layer; and
        a second mode-expanding layer is located in-between said mode-expanding layer and said optical cladding layer, said second mode-expanding layer having a refractive index that is in-between said refractive index of said mode-expanding layer and said refractive index of said optical cladding layer.

16. The apparatus of claim 15, wherein said tapered optical core is continuous with a waveguide core and said optical cladding layer is continuous with a waveguide cladding and said mode-expanding layer covers both said tapered optical core and said waveguide core.

17. A method for operating an apparatus, comprising:

sending an optical signal through a core of an optical fiber having a first mode size; and coupling said optical signal between said optical fiber core and a planar waveguide core having a second mode size, including expanding said second mode size to substantially match said first mode size by passing said optical signal through an optical-mode-converter structure, said optical-mode-converter structure including:

a tapered optical core on a planar substrate;

an optical cladding layer covering said optical core;

a mode-expanding layer covering said tapered optical core and located in-between said tapered optical core and said optical cladding layer, said mode-expanding layer having a refractive index that is in-between a refractive index of said tapered optical core and a refractive index of said optical cladding layer; and a second mode-expanding layer is located in-between said mode-expanding layer and said optical cladding layer, said second mode-expanding layer having a refractive index that is in-between said refractive index of said mode-expanding layer and said refractive index of said optical cladding layer.

18. The method of claim 17, wherein said first mode size ranges from about 8 to 10 microns and said second mode size ranges from about 0.5 to 1 microns.

19. The method of claim 17, wherein said thickness of said mode-expanding layer has a thickness variation of about ±10 percent or less.

20. A method for manufacturing an apparatus, comprising:
fabricating an optical-mode-converter structure, including:

providing a planar substrate having a first material layer on a second material layer, wherein said first material layer has a higher refractive index than said second material layer;

patterning said first material layer to form a tapered optical core;

coating said tapered optical core with a third material to form a mode-expanding layer of a uniform thickness;

coating said mode expanding layer with a fourth material to form a second mode-expanding layer;

covering said tapered optical core, said mode-expanding layer and said second mode expanding layer with a fifth material to form an optical cladding layer, wherein:

said mode-expanding has a refractive index that is in-between said refractive index of said tapered optical core and a refractive index of said optical cladding layer, and said second mode-expanding layer has a refractive index that is in-between said refractive index of said mode-expanding layer and said refractive index of said optical cladding layer.

21. The method of claim 20, wherein said patterning further includes patterning said first material layer to form a waveguide optical core of a waveguide optically coupled to said optical-mode-converter structure, and said coating further includes coating said waveguide optical core with said third material.

22. The method of claim 20, wherein said thickness of said mode-expanding layer has a thickness variation of about ±10 percent or less.

* * * * *